United States Patent [19]

Misato et al.

[11] Patent Number: 5,777,217
[45] Date of Patent: Jul. 7, 1998

[54] ROTATION-DIRECTION SIGNAL INCLUSION DEVICE

[75] Inventors: Hisashi Misato, Ibo-gun; Tukasa Motobayashi, Akoo-gun, both of Japan

[73] Assignee: Kabushiki Kaisha Teikoku Denki Seisakusho, Osaka, Japan

[21] Appl. No.: 734,037

[22] Filed: Oct. 18, 1996

[30] Foreign Application Priority Data

Oct. 19, 1995 [JP] Japan ................ 7-270907

[51] Int. Cl.$^6$ .................................. G01M 19/00
[52] U.S. Cl. ........................ 73/118.1; 324/207.13
[58] Field of Search ...................... 73/118.1, 116; 324/207.23, 207.25, 207.12, 207.13, 207.14

[56] References Cited

U.S. PATENT DOCUMENTS

| | | | |
|---|---|---|---|
| 4,924,180 | 5/1990 | Nasr et al. | 324/207.15 |
| 4,942,346 | 7/1990 | Ardit et al. | 318/280 |
| 5,336,996 | 8/1994 | Rusnak | 324/207.23 |
| 5,500,585 | 3/1996 | Aab | 324/207.21 |

Primary Examiner—Richard Chilcot
Assistant Examiner—Max H. Noori
Attorney, Agent, or Firm—Morrison Law Firm

[57] ABSTRACT

A rotation-direction signal inclusion device which outputs the larger of a rotation-direction signal and a bearing-wear signal includes a limiter circuit which limits, or "clips", a bearing-wear signal when a short-circuit wire connected across the limiter circuit is opened. When the short-circuit wire is intact, the bearing-wear signal bypasses the limiter circuit and the bearing-wear signal is not limited.

19 Claims, 4 Drawing Sheets

ROTATION-DIRECTION SIGNAL INCLUSION DEVICE

BACKGROUND OF THE INVENTION

The present invention is a rotation-direction signal inclusion device for detecting both a rotation-direction signal of a motor and a bearing-wear signal. The rotation-direction inclusion device receives a bearing-wear signal from a bearing-wear detecting circuit incorporated in the motor and a rotation-direction signal from a rotation-direction detecting circuit. The present invention includes a signal limiting diode as an integral part of the device which can be activated, ie. included in the circuit, by opening a short-circuit path around the diode.

Among various conventional uses of a rotation-direction signal inclusion device of this type is one offered in Japanese Patent Publication No. 31290/1984, which relates to an operation monitoring device for a canned motor.

The referenced prior art operation monitoring device includes a bearing-wear detecting circuit for detecting bearing-wear of a canned motor. The bearing wear detecting circuit includes detector coils serially connected in a stator core of the canned motor so that fundamental frequency components generated by the coils cancel each other out under normal operating conditions. When the bearings wear out, the rotor of the motor rotates eccentrically and the current induced in the detector coils is not symmetrical. An output signal is generated based on the difference in the induced voltage in each of the detector coils. In this prior art reference, a rotation-direction detecting circuit detects the rotation-direction of the canned motor. A signal combining circuit receives signals output by the bearing-wear detecting circuit and the rotation-direction detecting circuit and outputs the larger of the two signals. An indicator receives the output of the signal combining circuit and indicates the level of the output signal from the signal combining circuit. The prior art device is designed such that when the canned motor is rotating in the reverse direction, an output signal from the rotation-direction detecting circuit exceeds that of when the canned motor is rotating in the forward direction. The output signal when the canned motor is rotating in the reverse direction also exceeds an output signal from the bearing-wear detecting circuit in the normal operation range of the canned motor.

During operation of the canned motor, a value in the normal range on the indicator indicates that the canned motor is operating normally and rotating in the forward direction. On the other hand, when the indicator indicates an abnormal value, the canned motor is either operating abnormally or turning in reverse. The motor should be actuated again with the phase sequence of the power applied to the motor reversed. If the indicator indicates a normal value in this second operation, the canned motor is in the normal operation and rotating in the forward direction. However, if the value on the indicator is in the abnormal range, it is clear that the motor is running in an abnormal condition though the direction of rotation cannot be ascertained. In this case, motor operation should be halted and the motor should be examined so that a decision can be made whether repair is necessary.

In short, a single indicator is capable of indicating both a result of bearing-wear detection and a result of rotation-direction detection by receiving an output signal produced by comparing a rotation-direction signal with the bearing-wear signal.

Referring to FIG. 6, the prior art rotation-direction signal inclusion device includes both a rotation-direction detecting circuit and a signal combining circuit embedded in molded body 1 by a resin molding process. A plurality of lead wires 3, each of which has a terminal lug 2, for inputting power supply signals to the rotation-direction detecting circuit, and a lead wire 4, for connecting the output of the bearing-wear detecting circuit to the signal combining circuit, are drawn from the outer surface of molded body 1. Terminal connectors 5 are also included on molded body for connecting the output of the signal combining circuit to a remote indicator (not shown).

It is frequently necessary to limit the initial value of the bearing-wear signals such that an output signal of the rotation-direction detecting circuit when the canned motor is rotating in the reverse direction exceeds an output signal from the bearing-wear detecting circuit in the normal operation range of the canned motor.

In the prior art device, adjusting diodes 6 are connected to the middle of lead wire 4 to limit the initial value of bearing-wear signals from the bearing-wear detecting circuit. After connecting adjusting diodes 6 to the middle of lead wire 4 by means of soldering or crimping, the connection is insulated with an insulating tape (not shown) wrapped around the connection. The connection of adjusting diodes 6 is conducted in a limited space because the need to include adjusting diodes 6 can only be determined after the rotation-direction signal inclusion device is already connected to the terminal block of the canned motor. Furthermore, the insulation of the connection is also necessarily done in a limited space. Because it is difficult to determine the correct polarity of the adjusting diode at the time of installation, two adjusting diodes 6 are connected in parallel, with their respective ends inverted, to prevent an error in polarity. This method of adjusting the initial value of the bearing-wear signal impairs operation efficiency. When the insulation of the connections is insufficient, various defects, such as current leakage and inductive interference from nearby wires occurs, creating false signals in the output of the bearing-wear detecting circuit.

OBJECTS AND SUMMARY OF THE INVENTION

It is an object of the present invention to provide a rotation-direction signal inclusion device that overcomes the drawbacks of the prior art devices.

It is another object of the present invention to provide a rotation-direction signal inclusion device which requires neither post-connection of adjusting elements nor insulating treatment even where it is necessary to adjust the initial value of bearing-wear signals from the bearing-wear detecting circuit.

It is yet another object of the present invention to provide a rotation-direction signal inclusion device which is capable of improving the operation efficiency even in a limited space.

A rotation-direction signal inclusion device according to the present invention outputs a signal based upon a comparison of a bearing-wear signal with a rotation-direction signal. The rotation-direction signal inclusion device receives the bearing-wear signal from a bearing-wear detecting circuit incorporated in a motor. The rotation-direction signal inclusion device also includes a rotation-direction detecting circuit which detects the direction of rotation of the motor and outputs the rotation-direction signal. A signal combining circuit compares the rotation-direction signal with the bearing-wear signals and outputs the larger of the two signals. An adjusting element adjusts the initial value of bearing-wear signals from the bearing-wear detecting circuit. A molded body covers the rotation-direction detecting circuit, the signal combining circuit and the adjusting element. Respective terminal portions of the rotation-direction detecting circuit and the signal combining circuit are provided on the outer surface of the molded body. A short-circuit wire is connected to and short-circuits the adjusting element. The principal part of the a short-circuit wire is incorporated in the molded body and the remaining part juts out of the molded body so that the adjusting element can be made functional by cutting the jutting part of the short-circuit wire. Therefore, where it is necessary to limit the initial value of bearing-wear signals input from the bearing-wear detecting circuit, the part of the short-circuit wire that juts out of the molded body is cut to open the short-circuit path.

Briefly, a rotation-direction signal inclusion device which outputs the larger of a rotation-direction signal and a bearing-wear signal includes a limiter circuit which limits, or "clips", a bearing-wear signal when a short-circuit wire connected across the limiter circuit is opened. When the short-circuit wire is intact, the bearing-wear signal bypasses the limiter circuit and the bearing-wear signal is not limited.

According to an embodiment of the present invention, there is provided, a rotation-direction signal inclusion device for detecting bearing wear and rotation-direction of a motor, including, a rotation-direction detecting circuit for receiving three-phase voltage supply signals which are input to the motor and outputting a rotation-direction signal, a comparator circuit, the comparator circuit including means for receiving the rotation-direction signal and a bearing-wear signal, the bearing wear signal generated by a bearing-wear detecting circuit installed in a stator housing of the motor, the comparator circuit including means for outputting a larger one of the rotation-direction signal and the bearing-wear signal, a signal adjustment device connected between the bearing-wear detecting circuit and the comparator circuit and the signal adjustment device including a short-circuit wire connecting one end of the signal adjustment device to the other such that the signal adjustment device is bypassed when the short-circuit wire is intact and the signal adjustment device is operative when the short-circuit wire is cut.

According to another embodiment of the present invention, there is provided, a rotation-direction signal inclusion device for detecting bearing wear and rotation-direction of a motor, including, first circuit means for receiving a three-phase voltage signal and outputting a rotation-direction signal, second circuit means for receiving the rotation-direction signal, the second circuit means also including means for receiving a bearing-wear signal from a third circuit means for generating a bearing wear signal, the third circuit means installed in the motor, the second circuit means further including means for outputting a larger one of the rotation-direction signal and the bearing-wear signal, a signal adjustment means for adjusting the bearing-wear signal, electrically connected between the second circuit means and the third circuit means and a short-circuit wire electrically connected across the signal adjustment means.

According to another embodiment of the present invention, there is provided, a rotation-direction signal inclusion device which receives a bearing-wear signal from a bearing-wear detecting circuit incorporated in a motor, and outputs a signal upon comparison of the bearing-wear signal with a rotation-direction signal wherein the rotation-direction signal inclusion device includes a rotation-direction detecting circuit which outputs the rotation-direction signal responsive to a sequence of a three-phase power supply, a comparator circuit receiving the rotation-direction signal from the rotation-direction detecting circuit and the bearing-wear signal from the bearing-wear detecting circuit and outputting the larger signal of the rotation-direction signal and the bearing-wear signal, a limiting circuit for adjusting the initial value of the bearing-wear signal from the bearing-wear detecting circuit, a molded body which encloses the rotation-direction detecting circuit, the comparator circuit, and the limiting circuit, terminal portions of the rotation-direction detecting circuit and the signal combining circuit on the outer surface of the molded body; and a short-circuit wire connected across the limiting circuit, with the principal part thereof incorporated in the molded body and the remaining part jutting out of the molded body so that the limiting circuit can be made operative by cutting the jutting part.

According to another embodiment of the present invention, there is provided, a rotation-direction signal inclusion device including, a comparator circuit, a rotation-direction detecting circuit having a rotation-direction input terminal electrically connectable to a three-phase power supply, the rotation-direction detecting circuit having a rotation-direction output terminal electrically connected to a first comparator circuit input terminal of the comparator circuit, a bearing-wear circuit having a bearing-wear output terminal, a limiter circuit electrically connected between the bearing wear output terminal and a second comparator circuit input terminal of said comparator and a short circuit wire electrically connected across the limiter circuit whereby the limiter circuit is bypassed when the short circuit wire is intact and the limiter circuit is operative when the short circuit wire is cut.

According to still another embodiment of the present invention, there is provided, a method for determining when a bearing-wear signal limiter circuit is required in a rotation-direction detection inclusion device and installing said beraing-wear signal limiter circuit including the steps of electrically connecting stator windings of a motor to power terminals such that the motor rotates in a forward direction when a phase-sequence of a three-phase power supply connected to the power terminals is positive, electrically connecting the three-phase power supply to the power terminals in a negative phase-sequence, cutting a short-circuit wire which is electrically connected across the bearing-wear signal limiter circuit if the output of a bearing-wear detection circuit in a normal operation range of the motor exceeds an output of the rotation-direction detection circuit when the three-phase power supply is connected in the negative sequence.

The above, and other objects, features and advantages of the present invention will become apparent from the following description read in conjunction with the accompanying drawings in which like reference numerals designate the same element.

DETAILED DESCRIPTION OF THE PREFERRED EMBODIMENT

Figure 1:
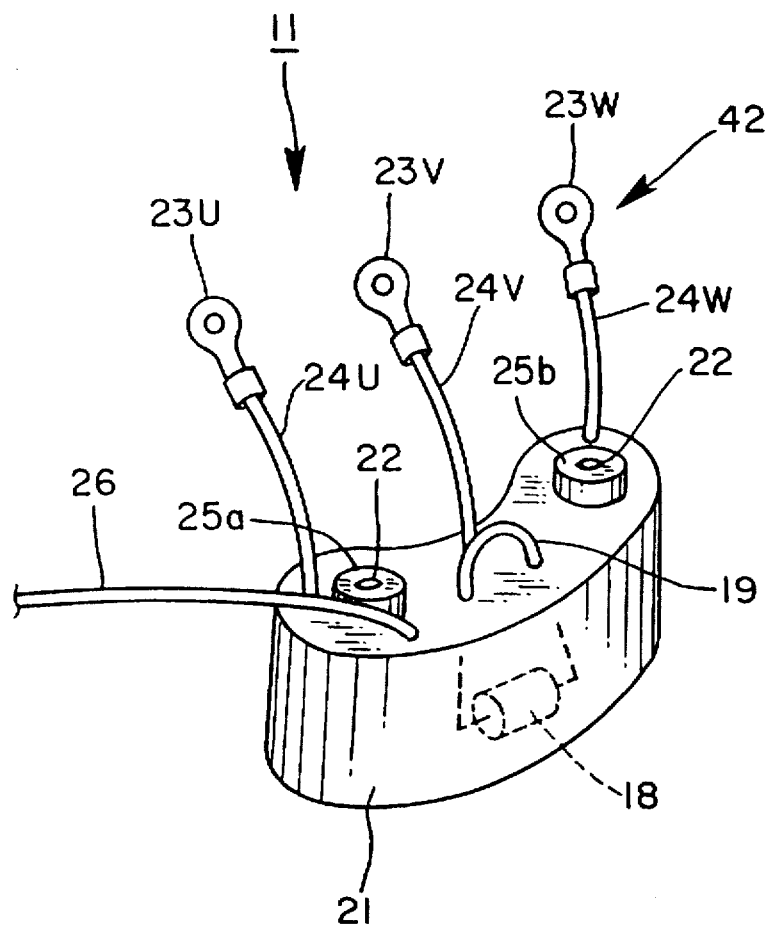
FIG. 1 is a perspective view of a rotation-direction signal inclusion device according to an embodiment of the present invention.

Referring to FIG. 1 a rotation-direction signal inclusion device 11 is set in a molded body 21. A pair of mounting holes 22 are bored through molded body 21. Terminals 25a, 25b are inserted into mounting holes 22. Three lead wires 24U,24V,24W, connected to the input side of rotation-direction inclusion device 11, are drawn out from molded body 21. Lead wires 24U,24V,24W have terminal lugs 23U,23V,23W attached to their ends to be connected to power terminals U,V,W (not shown). Molded body 21 also includes an adjusting diode 18 embedded therein. A single lead wire 26 connected to a cathode end of adjusting diode 18, is drawn out from molded body 21. A U-shaped portion of a short-circuit wire 19, connected between the cathode end and an anode end of adjusting diode 18, juts out of a surface area of molded body 21. Terminal lugs 23U, 23V, 23W, terminals 25a, 25b and a terminal 41 of lead wire 26, are part of a terminal portion 42, which will be described later in more detail.

Figure 2:
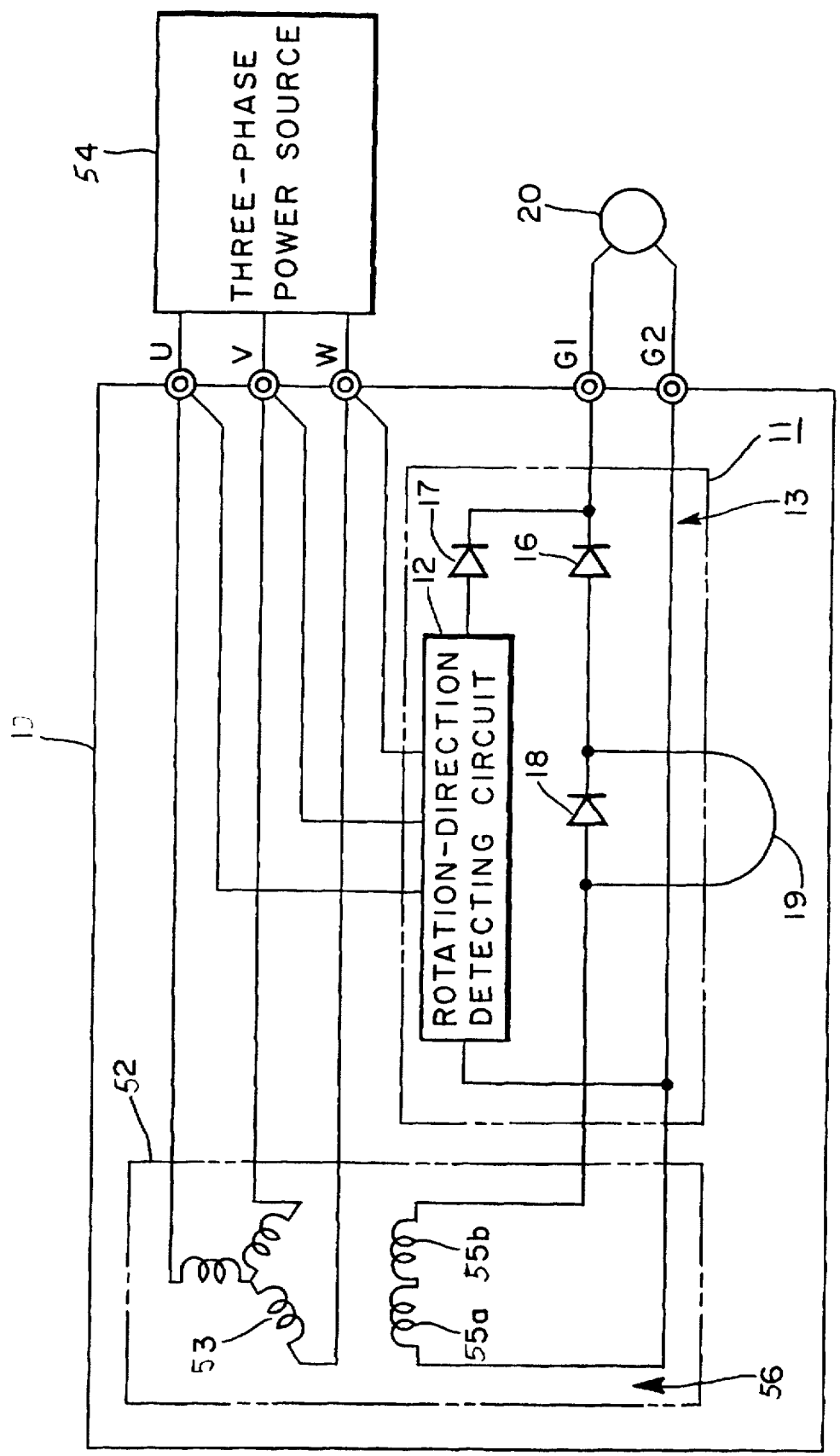
FIG. 2 is a block diagram of a canned motor pump wherein the rotation-direction signal inclusion device of FIG. 1 is used.

Referring to FIG. 2, a canned motor pump 10 includes a canned motor 52 for converting electrical power into mechanical power. Canned motor 52 is a three-phase induction motor, wherein three-phase stator wires 53, which are respectively coiled around stator cores within canned motor 52, are connected through power terminals U,V,W to a three-phase power source 54.

A bearing-wear detecting circuit 56 includes two detection coils 55a, 55b symmetrically arranged and embedded in the stator core of canned motor 52. As the rotor of canned motor 52 rotates, a magnetic flux induces current in detection coils 55a, 55b. Detection coils 55a, 55b are connected serially in opposing polarities so that the voltage in each detection coil 55a, 55b cancels the other. When the bearings of canned motor 52 start to wear, the rotor rotates eccentrically. When this happens the rotor path of rotation induces an unequal magnetic flux in each of detecting coils 55a, 55b. The voltage in each of detection coils 55a, 55b now do not cancel each other out and a signal voltage is generated.

Although the preferred embodiment discloses two detection coils, the bearing-wear detection circuit can also be made of more than two detection coils, arranged in the stator core so that the induced voltages in the coils cancel each other out under normal operating conditions.

Rotation-direction signal inclusion device 11 also includes a rotation-direction detecting circuit 12 and a signal combining circuit 13. Signal combining circuit 13 is formed by connecting the cathode of diode 16 to a first end of the output side of bearing-wear detecting circuit 56 and the cathode of diode 17 to a first end of rotation-direction detecting circuit 12. The anodes of both diodes 16 and 17 are connected to a terminal G1. A second end of the output side of bearing-wear detecting circuit 56 and a second end of rotation-direction detecting circuit 12 are both connected to a terminal G2.

Although in the preferred embodiment, the signal combining circuit consists of two diodes, the signal combining circuit can be any type of known comparator circuit that receives two input signals and outputs the larger of those two input signals.

Terminals G1, G2 are connected to a voltage meter 20, which indicates the output voltage of signal combining circuit 13. The greater value of the two detected voltages from bearing-wear detecting circuit 56 and rotation-direction detecting circuit 12 (which are rectified and received by diodes 16,17, and adjusting diode 18 in cases where short-circuit wire 19 has been cut) is indicated on voltage meter 20.

Although the indicator is described as being a voltage meter which merely outputs the received signal, other types of indicators can be used such as an alarm type device which indicates whether a predetermined setpoint, or abnormal level, has been reached. The abnormal level indicates bearing wear or reverse rotation of canned motor 52.

The cathode of adjusting diode 18 is connected to the first end of the output side of bearing-wear detecting circuit 56. The anode of adjusting diode 18 is connected to the cathode of diode 16. Both ends of adjusting diode 18 are also connected to short-circuit wire 19 for short-circuiting adjusting diode 18. As shown in FIG. 1, a U-shapes portion of short-circuit wire 19 juts out of rotation-direction signal inclusion device 11. It is possible to activate adjusting diode 18 by means of opening the short circuit, in other words, cutting the U-shaped portion of short-circuit wire 19 which juts out of rotation-direction signal inclusion device. Adjusting diode 18 limits the initial value of bearing-wear signals input from bearing-wear detecting circuit 56 when adjusting diode 18 is activated.

Figure 3:
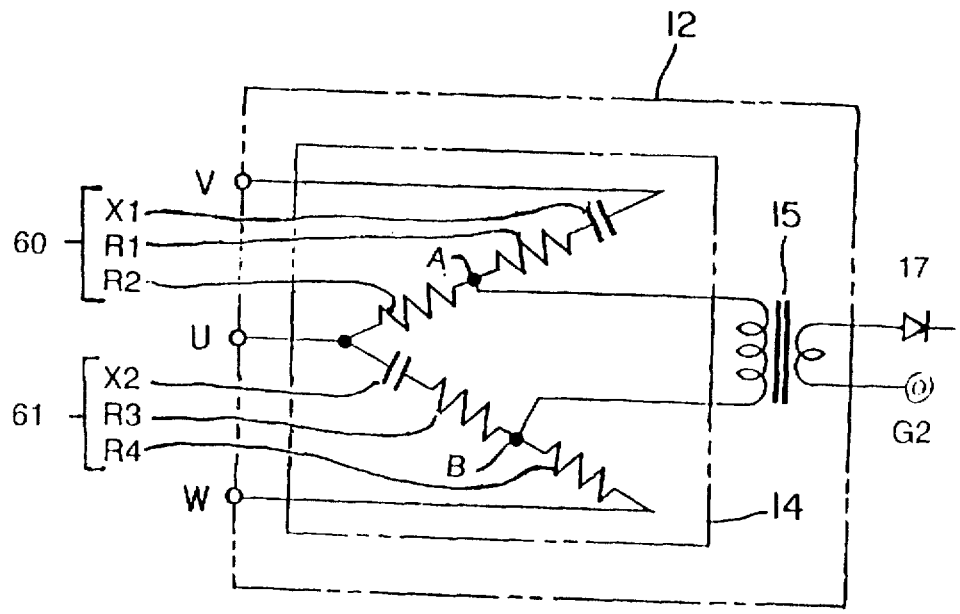
FIG. 3 is a block diagram of a rotation-direction detecting circuit of the rotation-direction signal inclusion device of FIG. 1.

Referring now to FIG. 3, rotation-direction detecting circuit 12 includes a phase sequence detecting circuit 14, which is connected to power terminals U,V,W. Phase sequence detecting circuit 14 includes a first series circuit 60 consisting of a capacitor X1 (0.033 F) and resistors R1 (43 Ω), R2 (91 Ω), and a second series circuit 61 consisting of a capacitor X2 (0.033 F) and resistors R3 (43 Ω), R4 (91 Ω). First series circuit 60 is connected between power terminals U, V and second series circuit 61 is connected between power terminals V, W. The primary circuit side of a step-down transformer 15 is connected between contact point A and contact point B. Contact point A is between resistors R1, R2 and contact point B is between resistors R3, R4. The secondary circuit side of step-down transformer 15 is connected to the cathode of diode 17 and terminal G2 of signal combining circuit 13. Therefore, the secondary circuit side connections of step-down transformer 15 are the first end and second end of rotation-direction detecting circuit 12, respectively, as described above referring to FIG. 2. These connections monitor the voltage across the series connection of resistor R2, capacitor X2, and resistor R3.

The voltage across first series circuit 60 leads the voltage across second series circuit 61 by 120° when the circuits are connected in a positive phase sequence U→V→W. The voltage across first series circuit 60 lags the voltage across second series circuit 61 by 120° when the circuits are connected in a negative phase sequence W→V→U. The capacitors and resistors of the rotation direction detecting circuit are designed such that the resulting voltage between contact point A and contact point B is relatively small (ideally zero) during a positive phase sequence and larger during a negative phase sequence.

In the preferred embodiment, first series circuit 60 and second series circuit 61 include capacitors and resistors. The result of rotation-direction detecting circuit 12 is achieved by using lead/lag characteristics of the voltage and current through capacitors and resistors such that the voltage across R2 cancels the voltage across X2 and R3 during a positive phase sequence. Similar results could be achieved with a circuit using inductors and resistors using the lead/lag characteristics of current and voltage through resistors and inductors. In fact a circuit could be designed using all three types of passive electrical components to achieve the same result. The present invention includes all such combinations because they are all a result of manipulation of the lead/lag relationship of voltage and current in resistors, capacitors, and inductors.

Figure 4:
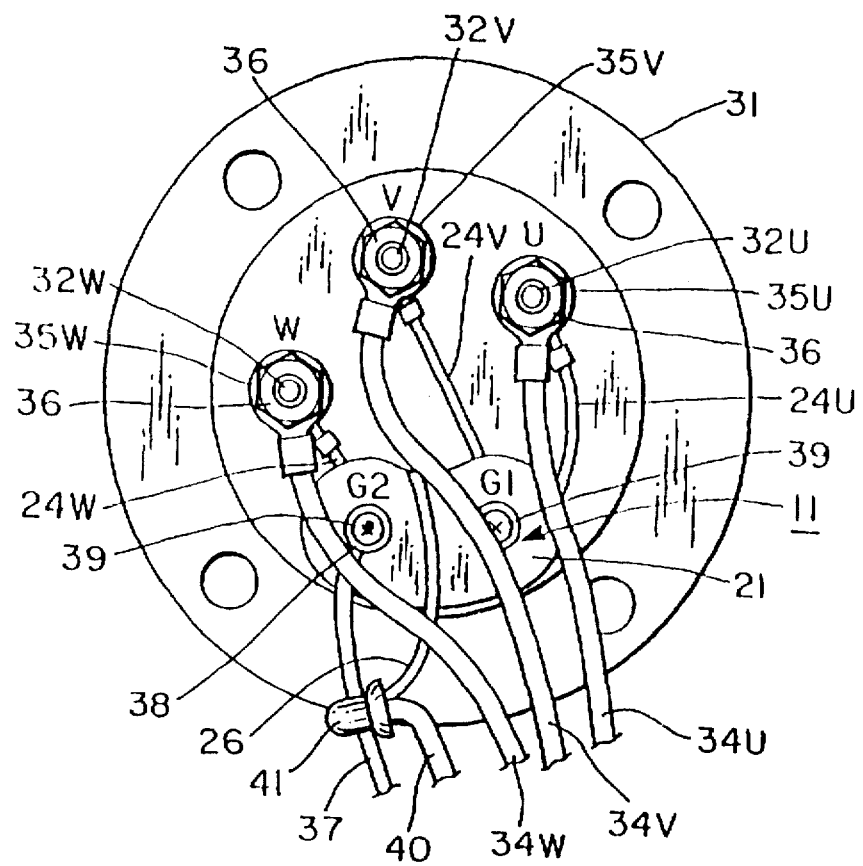
FIG. 4 is a back view of a terminal block of the rotation-direction signal inclusion device of FIG. 1.

Referring now to FIG. 4, rods 32U,32V,32W protrude from a back face of a terminal block 31. Rods 32U,32V,32W correspond to power terminals U,V,W in the block diagram of FIG. 2. Terminal lugs 35U,35V,35W at the end of power lines 34U,34V,34W are mounted onto rods 32U,32V,32W to connect power supply 14 to stator windings 53 of canned motor 52 (stator windings 53 and canned motor 52 are not shown in FIG. 4). Terminals lugs 35U,35V,35W are mechanically and electrically connected to rods 32U,32V, 32W by nuts 36 which are screwed onto threaded ends of rods 32U,32V,32W.

Lead wire 26 is electrically and mechanically connected via a terminal lug 41 to a lead wire 40. Lead wire 26 is connected to the first input end of signal combining circuit 13 (signal combining circuit 13 is not shown in FIG. 4).

Figure 5:
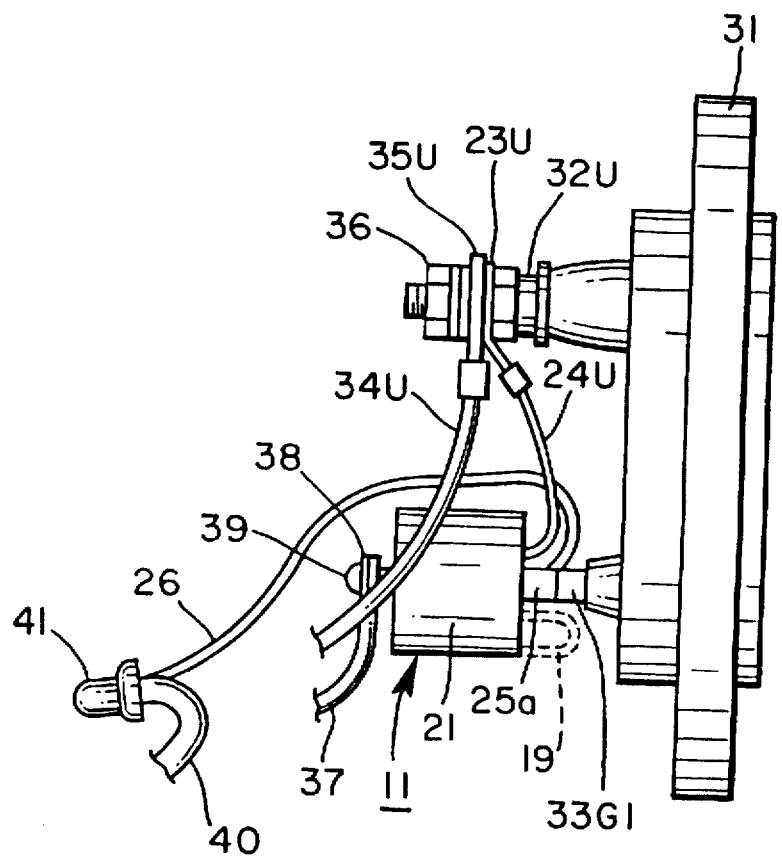
FIG. 5 is a side view of the terminal block of FIG. 4.
Figure 6:
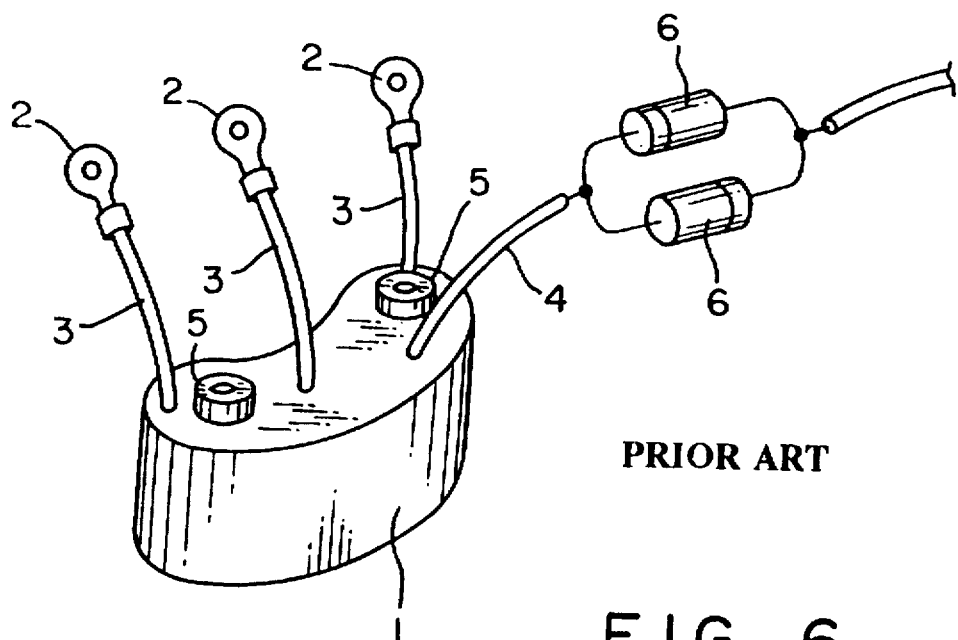
FIG. 6 is a perspective view of a prior art rotation-direction signal inclusion device.

Referring now also to FIG. 5, rods 33G1,33G2 are respectively inserted in mounting holes 22 of molded body 21. Terminal 38 is connected to rod 33G2. Molded body 21 is mechanically affixed to rods 33G1, 33G2 by screws 39 which screw into rods 33G1 and 33G2. Screws 39 also mechanically and electrically connect terminal 25a to rod 33G1 and terminals 25b and 38 to rod 33G2. Lead wire 37 is connected to the second input end of signal combining circuit 13.

With the configuration as above, the wiring represented by the block diagram shown in FIG. 2 is obtained.

Next, the function of the present invention is explained. When a rotor of canned motor 52 rotates in response to voltage supplied to canned motor 52, a magnetic flux induces current in both detection coils 55a, 55b of bearing-wear detecting circuit 56 due to the current through the stators of canned motor 52, thereby creating voltage across detection coils 55a, 55b. The difference in voltage is embodied as detected voltage at an output end of bearing-wear detecting circuit 56. Since voltages in detection coils 55a, 55b have an identical phase and value during the normal operation of canned motor 52, the output voltage of bearing-wear detection circuit 56 should be zero. In cases where the rotor rotates eccentrically due to wear of the bearing of canned motor 52, the gap between the rotor and the stator core becomes uneven. The voltages in detection coils 55a, 55b also become uneven, which is indicated as an increase in the detected voltage.

When power is supplied to canned motor 52, three-phase alternating current applied power terminals U,V,W is also connected to rotation-direction detecting circuit 12. As explained above, when the phase sequence of three-phase AC to phase sequence detecting circuit 14 is positive, i.e. U→V→W, voltage applied to the primary circuit of step-down transformer 15 of phase sequence detecting circuit 14 is zero. However, in case of a negative phase sequence (W→V→U), voltage applied to the primary circuit of step-down transformer 15 of phase sequence detecting circuit 14 is the difference between power terminals U and V, V and W or W and U. The voltage is reduced by step-down transformer 15 and embodied at the secondary circuit end of the transformer as the voltage detected by rotation-direction detecting circuit 12. Therefore, in cases where stator windings 53 and power terminals U,V,W are connected together beforehand in such a manner that canned motor 52 rotates in the forward direction when three-phase alternating current applied to power terminals U,V,W of canned motor 52 is positive (U→V→W), a low (zero) detected voltage and a large detected voltage produced by rotation-direction detecting circuit 12 respectively suggest forward and reverse rotation of canned motor 52.

After detected voltages from bearing-wear detecting circuit 56 and rotation-direction detecting circuit 12 are rectified and received by diodes 16, 17 (and adjusting diode 18 in cases where short-circuit wire 19 has been cut) of signal combining circuit 13, the greater value of the two detected voltages is indicated on voltage meter 20.

As described above, during operation of canned motor 52, if voltage meter 20 indicates a normal value, canned motor 52 is operating normally and turning in the forward direction. On the other hand, if voltage meter 20 indicates an abnormal value, canned motor 52 is either in an abnormal operation or being driven in reverse. When an abnormal reading occurs, canned motor 52 should be actuated again with the phase sequence of the power applied to the motor reversed. If voltage meter 20 indicates a normal value at that time, canned motor 52 is in the normal operation and turning in the forward direction. However, if the value on voltage meter 20 is still in the abnormal range, it is clear that canned motor 52 is running in an abnormal condition though the direction of rotation cannot be ascertained. In this case, the motor should be halted and examined so that decision can be made whether repair is necessary.

In short, a single voltage meter 20, or other detecting device as described above, is capable of indicating both bearing-wear and rotation-direction by means of receiving a bearing-wear signal from bearing-wear detecting circuit 56 and outputting a signal upon comparison of a rotation-direction signal with the rotation-direction signal.

It is sometimes necessary to include adjusting diode 18 to signal combining circuit 13 to limit the initial value of bearing-wear signals received from bearing-wear detecting circuit 56 such that an output signal from rotation-direction detecting circuit 12 during reverse rotation of canned motor 52 exceeds an output signal from bearing-wear detecting circuit 56 in the normal operation range of canned motor 52. In this case, the jutting portion of short-circuit wire 19, i.e. the portion jutting out of molded body 21, should be cut with a tool, such as a pliers, so that adjusting diode 18 is activated, ie. included in the rotation-detection signal inclusion device circuitry.

As described above, adjusting diode 18 can be activated simply by cutting short-circuit wire 19, with no requirement of a bonding operation, such as soldering or crimping, or insulating operation, which are necessary in the prior art device. Since cutting short-circuit wire 19 requires only a minimal space, operation efficiency is improved.

In addition, since the connection of adjusting diode 18 is done before the device is covered by molded body 21, a single adjusting diode 18 is sufficient, with no need of using two adjusting diodes which is necessary in case of a conventional device to prevent an error in polarity.

Furthermore, because adjusting diode 18 is incorporated in molded body 21, the invention is also effective in preventing various malfunctions which may otherwise be caused by damp connections, cluttered connections and other leakage problems caused by imperfect connections.

The adjustment diode 18 is described and illustrated as a single diode. The adjustment diode 18 does not have to be a single diode. Instead, any limiter type circuit or "clipping"

circuit which limits, or "clips", the bearing-wear signal can be used in place of diode 18.

In the configuration of a rotation-direction signal inclusion device according to the present invention, an adjusting element is incorporated in a molded body while a part of a short-circuit wire for short-circuiting the adjusting element juts out of the molded body. Therefore, in cases where it is necessary to adjust the initial value of bearing-wear signals that are input from the bearing-wear detecting circuit, what is required is simply cutting the part of the short-circuit wire that juts out of the molded body. Thus, the rotation-direction signal inclusion device according to the invention requires neither post-connection of adjusting elements nor insulating treatment and permits operation in a limited space, thereby improving the operation efficiency.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A rotation-direction signal inclusion device for detecting a bearing wear and a rotation-direction of a motor, comprising:

a rotation-direction detecting circuit for receiving three-phase voltage supply signals input to said motor and for outputting a rotation-direction signal;

said rotation-direction detecting circuit including at least two impedances;

a comparator circuit;

bearing-wear means for generating a bearing-wear signal;

said comparator circuit including means for receiving said rotation-direction signal and said bearing-wear signal;

said bearing-wear means including a plurality of detection coils;

said comparator circuit including means for outputting a larger one of said rotation-direction signal and said bearing-wear signal;

a signal adjustment device connected between said bearing-wear detecting circuit and said comparator circuit; and said signal adjustment device including a short-circuit wire connecting one end of said signal adjustment device to another end thereof to bypass said signal adjustment device when said short-circuit wire is intact and to activate said signal adjustment device when said short-circuit wire is cut.

2. The rotation-direction signal inclusion device of claim 1, further including:

a molded resin body encasing said rotation-direction detecting circuit, said comparator circuit and said signal adjustment device; and a portion of said short-circuit wire jutting out from said molded resin body.

3. The rotation-direction signal inclusion device of claim 1, further including:

an indicator for displaying said larger one of said rotation-direction signal and said bearing-wear signal.

4. The rotation-direction signal inclusion device of claim 1, wherein said signal adjustment device is a current limiting circuit.

5. The rotation-direction signal inclusion device of claim 1, wherein said signal adjustment device is a diode.

6. A rotation-direction signal inclusion device for detecting bearing wear and rotation-direction of a motor, comprising:

first circuit means for receiving a three-phase voltage signal and outputting a rotation-direction signal;

said first circuit means including at least two impedances;

second circuit means for receiving said rotation-direction signal;

third circuit means for generating a bearing wear signal;

said second circuit means including means for receiving said bearing-wear signal said third circuit means installed in said motor and including a plurality of detection coils;

said second circuit means further including means for outputting a larger one of said rotation-direction signal and said bearing-wear signal;

a signal adjustment means for adjusting said bearing-wear signal, electrically connected between said second circuit means and said third circuit means; and a short-circuit wire electrically connected across said signal adjustment means.

7. The rotation-direction signal inclusion device of claim 6, further including:

a molded resin body encasing said first circuit means, said second circuit means, and said signal adjustment means; and a portion of said short-circuit wire jutting out from said molded resin body.

8. The rotation-direction signal inclusion device of claim 6, wherein said second circuit means is a comparator circuit.

9. The rotation-direction signal inclusion device of claim 6, wherein said signal adjustment means is a limiter circuit.

10. The rotation-direction signal inclusion device of claim 6, wherein said signal adjustment means is a diode.

11. A rotation-direction signal inclusion device which receives a bearing-wear signal from a bearing-wear detecting circuit including a plurality of detection coils incorporated in a motor, and outputs a signal upon comparison of said bearing-wear signal with a rotation-direction signal wherein said rotation-direction signal inclusion device comprises:

a rotation-direction detecting circuit including at least two impedances;

said rotation-direction detecting circuit including means for outputting said rotation-direction signal responsive to a sequence of a three-phase power supply;

a comparator circuit receiving said rotation-direction signal from said rotation-direction detecting circuit and said bearing-wear signal from said bearing-wear detecting circuit and outputting the larger signal of said rotation-direction signal and said bearing-wear signal;

a limiting circuit for adjusting an initial value of said bearing-wear signal;

an enclosure enclosing said rotation-direction detecting circuit, said comparator circuit, and said limiting circuit;

terminal portions of said rotation-direction detecting circuit and said comparator circuit being disposed on the outer surface of said enclosure; and a short-circuit wire connected across said limiting circuit, with a principal part thereof incorporated in said enclosure and a remaining part jutting out of said enclosure so that said limiting circuit can be made operative by cutting said remaining part.

12. A rotation-direction signal inclusion device comprising:
- a comparator circuit;
- a rotation-direction detecting circuit including at least two impedances and having an input terminal electrically connectable to a three-phase power supply;
- said rotation-direction detecting circuit having an output terminal electrically connected to a first input terminal of said comparator circuit;
- a bearing-wear circuit having an output terminal and a plurality of detection coils;
- a limiter circuit electrically connected between said bearing-wear circuit output terminal and a second input terminal of said comparator circuit; and
- a short circuit wire electrically connected across said limiter circuit.

13. The rotation-direction signal inclusion device of claim 12, further including an indicator electrically connected to an output terminal of said comparator circuit.

14. The rotation-direction signal inclusion device of claim 13, wherein said indicator displays an analog output.

15. The rotation-direction signal inclusion device of claim 13, wherein said indicator displays an indication when said output of said comparator circuit is greater than a predetermined level.

16. The rotation-direction signal inclusion device of claim 12, wherein said limiter circuit is a diode.

17. The rotation-direction signal inclusion device of claim 12, wherein said comparator circuit includes:
- a first diode having a first cathode electrically connected to said first input terminal of said comparator circuit and a first anode electrically connected to an output terminal of said comparator circuit; and
- a second diode having a second cathode electrically connected to said second comparator circuit input terminal and a second anode electrically connected to said output terminal of said comparator circuit.

18. A method for determining when a bearing-wear signal limiter circuit is required in a rotation-direction detection inclusion device and installing said bearing-wear signal limiter circuit, said bearing-wear signal limiter circuit being electrically connected in said rotation-direction detection inclusion device between a bearing-wear detection circuit and a first input to a comparator circuit with-a short circuit wire electrically connected across said bearing-wear signal limiter circuit, comprising the steps of:
- electrically connecting stator windings of a motor to power terminals such that said motor rotates in a forward direction when a phase-sequence of a three-phase power supply connected to said power terminals is positive;
- electrically connecting said three-phase power supply to said power terminals in a negative phase-sequence;
- electrically connecting a rotation-direction detection circuit to said three-phase power supply and to a second said comparator circuit; and
- cutting said short-circuit wire when an output of said bearing-wear detection circuit in a normal operation range of the motor exceeds an output of said rotation-direction detection circuit when said three-phase power supply is connected in said negative sequence.

19. A method for selectively connecting a bearing-wear signal limiter circuit in a rotation-direction detection inclusion device comprising the steps of:
- connecting an output terminal of a rotation-direction detecting circuit to a first input terminal of a comparator circuit;
- connecting said bearing-wear signal limiter circuit between an output terminal of a bearing wear detection circuit and a second input terminal of said comparator circuit;
- cutting a short-circuit wire electrically connected across said bearing-wear signal limiter circuit when said output of said bearing-wear detection circuit in a normal operation range of the motor exceeds an output of said rotation-direction detection circuit when a three-phase power supply is connected in a negative sequence.

\* \* \* \* \*